US010127128B2

(12) United States Patent
Che et al.

(10) Patent No.: US 10,127,128 B2
(45) Date of Patent: Nov. 13, 2018

(54) PERFORMANCE ENGINEERING PLATFORM USING PROBES AND SEARCHABLE TAGS

(71) Applicant: Oracle International Corporation, Redwood Shores, CA (US)

(72) Inventors: Christopher Che, San Jose, CA (US); Robert Mulholland, Ottawa (CA); Zhong Liu, San Ramon, CA (US); Sumit Biswas, Bangalore (IN); Cherif Tawil, Vaughan (CA); Mark Christmas, Ottawa (CA)

(73) Assignee: Oracle International Corporation, Redwood Shores, CA (US)

( * ) Notice: Subject to any disclaimer, the term of this patent is extended or adjusted under 35 U.S.C. 154(b) by 122 days.

(21) Appl. No.: 14/956,028

(22) Filed: Dec. 1, 2015

(65) Prior Publication Data
US 2017/0153935 A1 Jun. 1, 2017

(51) Int. Cl.
*G06F 11/07* (2006.01)
*G06F 11/30* (2006.01)
(Continued)

(52) U.S. Cl.
CPC ........ *G06F 11/3089* (2013.01); *G06F 11/006* (2013.01); *G06F 11/0766* (2013.01);
(Continued)

(58) Field of Classification Search
CPC ............. G06F 11/0787; G06F 11/0766; G06F 11/3466; G06F 11/0778; G06F 11/0769; G06F 11/0772; G06F 11/0775
See application file for complete search history.

(56) References Cited

U.S. PATENT DOCUMENTS 7,100,152 B1 * 8/2006 Birum ................. G06F 11/3466
707/999.1
7,111,059 B1 9/2006 Garcea et al.
(Continued)

OTHER PUBLICATIONS

Gabel et al., "CAMP: A Common API for Measuring Performance", Proceedings of the 21st Large Installation System Administration Conference (LISA '07) (Dallas, TX: USENIX Association, Nov. 11-16, 2007), Online available at <https://www.usenix.org/legacy/event/lisa07/tech/full_papers/gabel/gabel_html/index.html>, Retrieved on May 21, 2015, 31 pages.

(Continued)

*Primary Examiner* — Yolanda L Wilson
(74) *Attorney, Agent, or Firm* — Invoke

(57) ABSTRACT

A performance engineering platform using one or more probes and one or more searchable tags is described. In an embodiment, a set of attributes of a system to be monitored are determined. Based on the attributes of the system, one or more probes that include functionality to detect data from the system are identified. Data is detected from the system using at least one of the probes. In an embodiment, one or more reports are obtained. The reports are based on data detected by a set of probes. An association between a particular searchable tag and one of the set of probes is received. Responsive to receiving the association between the particular searchable tag and the probe, report values, associated with a subset of the data detected by the probe, are identified. Further, the report values are tagged with the particular searchable tag.

15 Claims, 7 Drawing Sheets

(51) Int. Cl.
*G06F 11/00* (2006.01)
*G06F 11/34* (2006.01)

(52) U.S. Cl.
CPC ...... *G06F 11/0775* (2013.01); *G06F 11/3072* (2013.01); *G06F 11/348* (2013.01)

(56) References Cited

U.S. PATENT DOCUMENTS

| | | | |
|---|---|---|---|
| 7,444,263 | B2 | 10/2008 | White et al. |
| 8,032,626 | B1 | 10/2011 | Russell et al. |
| 8,146,086 | B2 | 3/2012 | Creamer et al. |
| 8,464,224 | B2 | 6/2013 | Dulip et al. |
| 8,874,688 | B1* | 10/2014 | Huntwork ........... H04L 63/1408 709/217 |
| 8,997,081 | B1* | 3/2015 | Manion .................... G06F 8/65 717/168 |
| 2005/0010933 | A1* | 1/2005 | Vaught ............. G06F 17/30923 719/328 |
| 2005/0182750 | A1* | 8/2005 | Krishna ............. G06F 11/3438 |
| 2006/0156077 | A1* | 7/2006 | Altaf .................. G06F 11/0775 714/57 |
| 2007/0174228 | A1 | 7/2007 | Folting et al. |
| 2008/0115103 | A1 | 5/2008 | Datars et al. |
| 2009/0199160 | A1 | 8/2009 | Vaitheeswaran et al. |
| 2010/0229112 | A1* | 9/2010 | Ergan .................. G06F 3/04895 715/764 |
| 2010/0293270 | A1* | 11/2010 | Augenstein ........... G06F 11/324 709/224 |
| 2010/0332918 | A1* | 12/2010 | Harnois .............. G06F 11/0766 714/57 |
| 2011/0138366 | A1* | 6/2011 | Wintergerst ........ G06F 11/3409 717/130 |
| 2011/0145498 | A1* | 6/2011 | Taillefer .................. G06F 9/467 711/118 |
| 2012/0124422 | A1* | 5/2012 | Hsiao .................. G06F 11/3466 714/26 |
| 2014/0074850 | A1* | 3/2014 | Noel ....................... G06F 9/542 707/741 |

OTHER PUBLICATIONS

Oracle, "Instrumenting Applications With DMS", Oracle® Application Server Performance Guide, Online available at <http://otndnld.oracle.co.jp/document/products/as10g/101300/B25221_03/core.1013/b25213/dms_app.htm>, Release 3, Retrieved on May 21, 2015, 35 pages.

* cited by examiner

Report Test Output

View report logic output and sample rendering executed on server

Report Output

```
<ocpepTable>
|*Calculation*|
|*User*|0%|
|*Sys*|0.13%|
|*IO*|0%|
|*Total*| <ocpepSearch>cpu_total_average=0.13</ocpepSearch>%|
</ocpepTable>
```

Searchable Results

| Index | Value |
|---|---|
| cpu_total_average | 0.13 |

Searchable Tag 324

Report Value 326

Rendered Report Output

| | Calculation |
|---|---|
| User | 0% |
| Sys | 0.13% |
| IO | 0% |
| Total | 0.13% |

Report Values 328

Screenshot 304

FIG. 3B

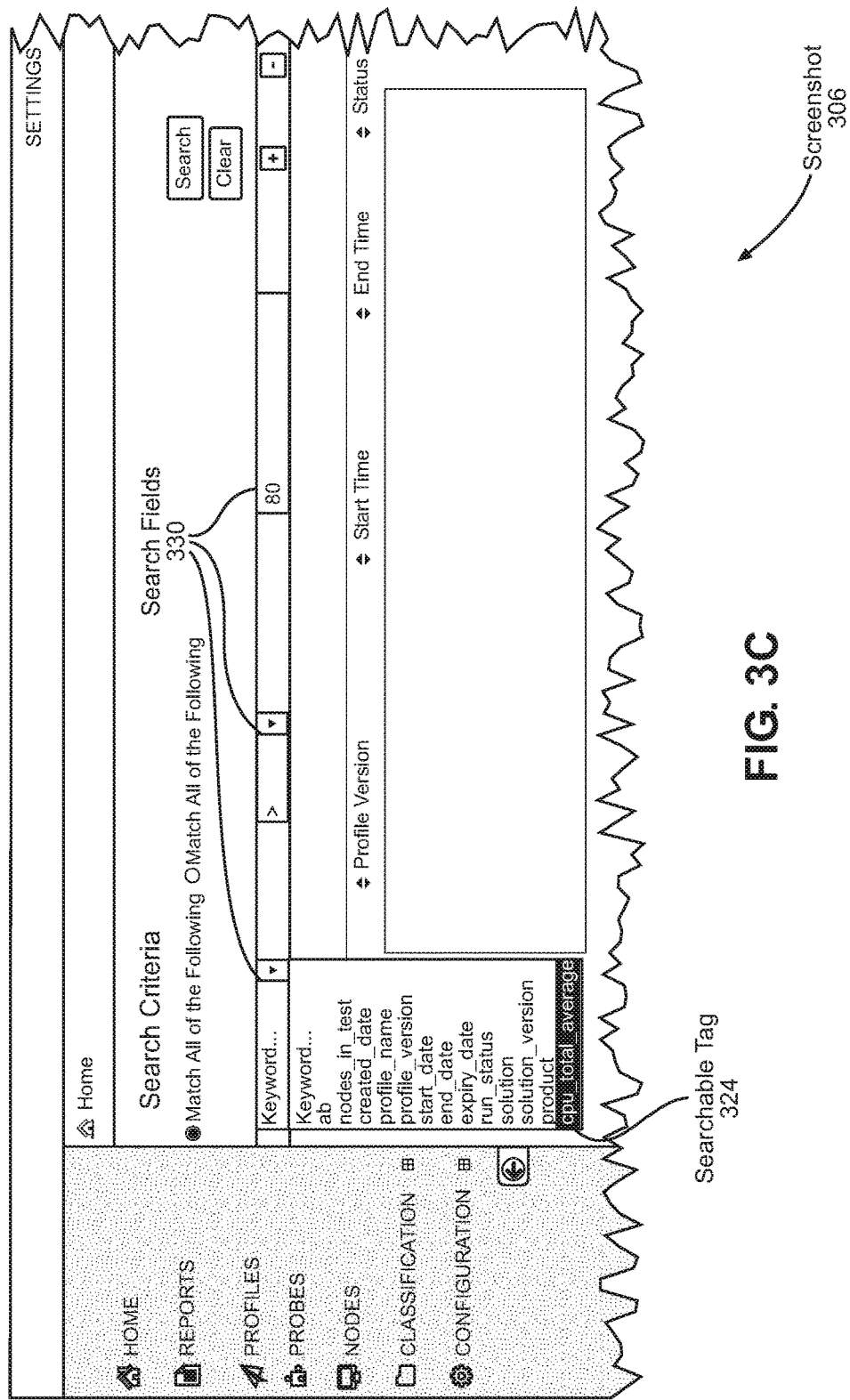

PERFORMANCE ENGINEERING PLATFORM USING PROBES AND SEARCHABLE TAGS

TECHNICAL FIELD

The present disclosure relates to performance engineering. In particular, the present disclosure relates to a performance engineering platform using probes and searchable tags.

BACKGROUND

One of the goals of performance engineering is to ensure that a target system meets non-functional requirements for performance and/or other performance criteria, such as throughput, latency, and memory usage. Performance testing is testing that is performed to determine performance metrics of one or more target systems. Specific types of performance testing include but are not limited to load testing, stress testing, soak testing, spike testing, configuration testing, and isolation testing. A large amount of data may be detected during a performance testing. The detected data is post-processed to compute performance metrics. The performance metrics are used to determine whether performance goals have been achieved.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 3A-3C illustrate an example performance engineering platform using probes and searchable tags.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. DETECTING DATA FROM TARGET SYSTEMS USING A PROBE
4. TAGGING REPORT VALUES WITH A SEARCHABLE TAG
5. EXAMPLE EMBODIMENT
6. MISCELLANEOUS; EXTENSIONS
7. HARDWARE OVERVIEW

1. General Overview

In one or more embodiments, data is detected from one or more target systems using a probe. The probe is selected from a set of probes based on one or more system attributes of the target system. In an embodiment, each probe is associated with a probe description, which identifies one or more system attributes of a system for which the probe detects data. For each probe, a determination is made as to whether there is a match between the system attributes identified in the probe description and the system attributes of the target system. If there is a match, then the probe is selected, and data is detected from the target system using the probe. A same probe may be used to detect data from multiple target systems, if the system attributes of the multiple target systems match the system attributes identified in the probe description.

In one or more embodiments, after a set of probes are used to detect data of a target system, one or more reports are obtained. The reports are based on the data detected using the set of probes. An association between a particular probe and a particular searchable tag is received. In an example, the association is received through user modification of a report specification corresponding to the particular probe. Responsive to the association between the particular probe and the particular searchable tag, values, included in the reports, that are associated with at least a subset of the data detected by the particular probe are identified. The values are tagged with the searchable tag and indexed. The values may be searched in a trending analysis.

2. Architectural Overview

Figure 1:
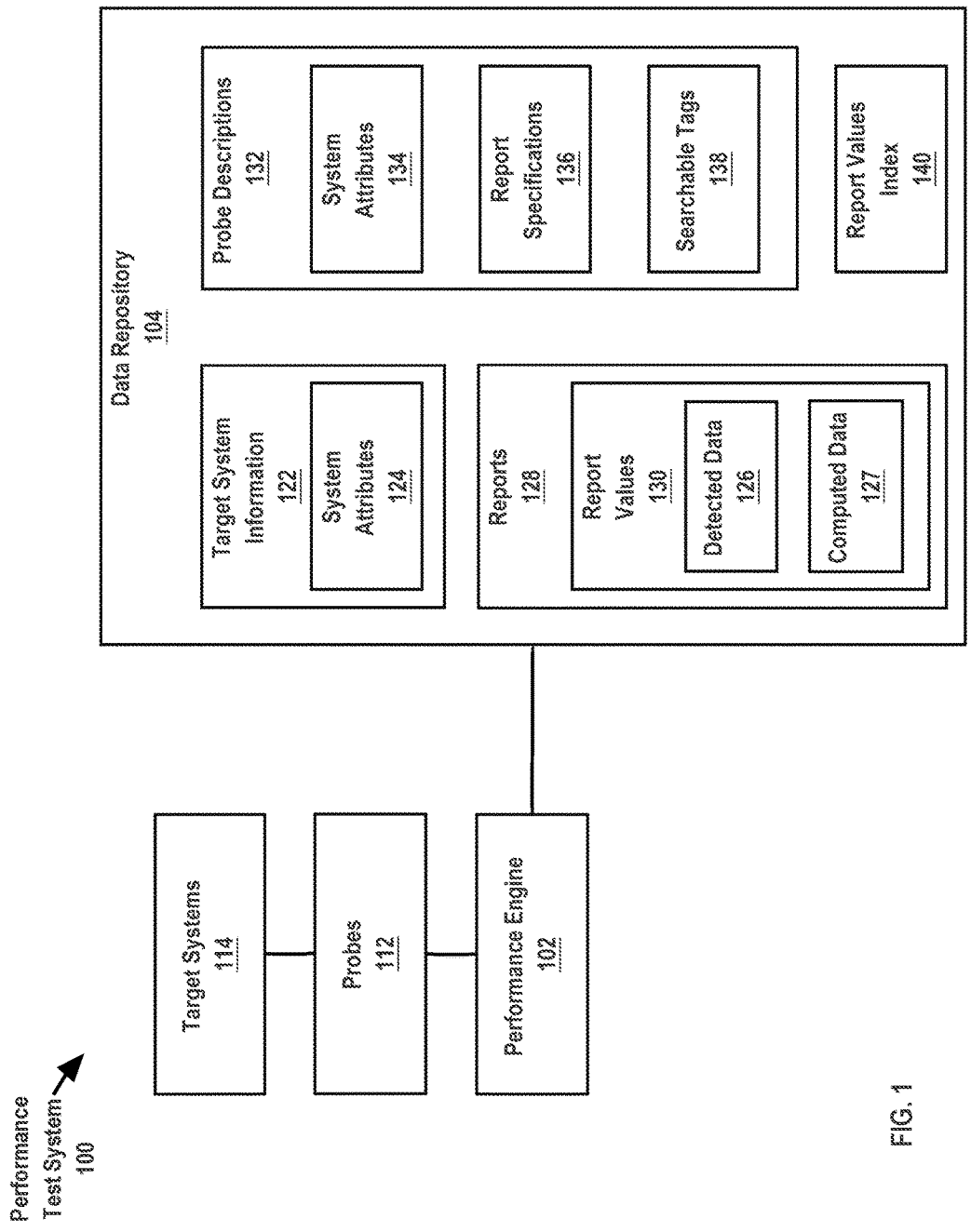
FIG. 1 illustrates a system in accordance with one or more embodiments.

FIG. 1 illustrates a performance test system 100 in accordance with one or more embodiments. As illustrated in FIG. 1, performance test system 100 includes performance engine 102, data repository 104, one or more probes 112, and one or more target systems 114. In one or more embodiments, performance test system 100 may include more or fewer components than the components illustrated in FIG. 1. The components illustrated in FIG. 1 may be local to or remote from each other. The components illustrated in FIG. 1 may be implemented in software and/or hardware and may be distributed over one or more applications and/or machines. Operations described with respect to one component may instead be performed by another component.

In one or more embodiments, target systems 114 refer to systems that are to be monitored by performance engine 102. Target systems 114 are systems from which detected data 126 is obtained. Each of target systems 114 includes one or more components that directly or indirectly interact with each other. The components may be implemented in hardware and/or software, such as a database, an application server, a central processing unit (CPU), memory, an operating system (OS), and an application. The components are integrated via one or more interfaces. Each target system is associated with an identifier.

In one or more embodiments, probes 112 refer to hardware and/or software configured to obtain detected data 126 from target systems 114. A probe may be used multiple times to obtain detected data 126 from a same target system and/or different target systems. Each time a probe is used may be referred to as a "testing session."

In an embodiment, each of probes 112 may include different sets of operations to obtain different detected data 126 from different target systems 114. In an example, a probe is configured to detect a start time and stop time of a particular transaction. In another example, a probe is configured to detect a frequency at which a particular memory location is accessed. In another example, a probe is configured to detect a number of times that a particular function is called. In another example, a probe is configured to detect a duration in which a CPU is in use, running background operations, waiting for input/output devices, and/or idle. In another example, a probe is configured to detect an amount of memory space that is used and/or available.

In an embodiment, each probe is associated with an identifier. Probes 112 are also associated with probe descriptions 132, which are described below.

In one or more embodiments, data repository 104 is any type of storage unit and/or device (e.g., a file system, database, collection of tables, or any other storage mechanism) for storing data. Further, data repository 104 may include multiple different storage units and/or devices. The multiple different storage units and/or devices may or may not be of the same type or located at the same physical site. Further, data repository 104 may be or may execute on the same computing system as performance engine 102. Alternatively or additionally, data repository 104 may be on a separate computing system than performance engine 102. Data repository 104 may be connected to performance engine 102 via a direct connection or via a network.

Target system information 122, one or more reports 128, one or more probe descriptions 132, and a report values index 140, may be implemented across any of components within performance test system 100. However, these components are illustrated within data repository 104 for purposes of clarity and explanation.

In one or more embodiments, target system information 122 includes information related to target systems 114, such as system attributes 124 of target systems 114. Each target system is associated with one or more system attributes 124. An example system attribute is a component used by a target system. Example hardware components include a database, an application server, and a CPU. Example software components include an OS (such as Google Android® (Android® is a trademark of Google, Inc.) and Apple iOS® (iOS® is a trademark of Apple, Inc.)), and a specific application or software product running on the OS.

In an embodiment, target system information 122 includes one or more issues associated with target systems 114. Example issues include throughput, latency, reliability, memory usage, CPU usage, access to a database, and response time at which data is retrieved from a database. An issue associated with a target system is identified based on historical data related to the target system. In an example, during a previous execution of a target system, a particular database could not be accessed. Based on past usage of the target system, access of the particular database is identified as an issue associated with the target system.

In one or more embodiments, probe descriptions 132 are associated with probes 112. In an embodiment, each probe description includes the identifier of the probe with which the probe description is associated. In another embodiment, an index or other table is stored to map each probe to a respective probe description.

In an embodiment, probe descriptions 132 are specified manually or determined by a system. Each of probe descriptions 132 identifies one or more characteristics of a probe. A probe description includes one or more system attributes 134, one or more report specifications 136, and one or more searchable tags 138. Alternatively, system attributes 134, report specifications 136, and/or searchable tags 138 may be implemented as separate components from the probe description.

In one or more embodiments, system attributes 134 of a probe description, associated with a particular probe, are attributes of a system for which the particular probe obtains detected data 126. In other words, the particular probe has functionality to obtain detected data 126 from any target systems 114 having system attributes 124 that match the system attributes 134 of the probe description. Examples of system attributes 134 include a component used by a target system. System attributes 134 identified in a probe description, associated with a particular probe, may be compared to system attributes 124 of a target system, to determine whether the particular probe is to be used to obtain detected data 126 from the target system. Additionally or alternatively, a probe description indicates one or more issues of a system for which the particular probe has functionality to obtain detected data 126. Example issues include throughput, latency, reliability, memory usage, CPU usage, access to a database, and speed at which data is retrieved from a database.

In an embodiment, a particular probe has functionality to obtain detected data 126 from any target systems 114. System attributes 134 corresponding to the particular probe include all system attributes 124 of all target systems 114. Alternatively, the probe description of the particular probe does not specify any system attributes 134.

In an embodiment, system attributes 134 are manually specified via user input. A user defines the system attributes 134 to be associated with a particular probe. A user may classify one set of probes with a first set of system attributes, and another set of probes with a second set of system attributes.

In an embodiment, system attributes 134 of a particular probe are determined, by a system, based on characteristics of the particular probe, such as the type of detected data 126 that is to be obtained by the particular probe, operations to be performed by the particular probe, and/or the language in which the particular probe is written. In an example, one type of detected data 126 obtained using a particular probe is a response time of a particular database. Thus, the particular probe has functionality to obtain detected data from a system that uses the particular database. In other words, a system attribute, of a system to be monitored by the particular probe, is the use of the particular database. The particular database is included as a system attribute identified in a probe description of the particular probe.

In one or more embodiments, report specifications 136 describe the content of reports 128 to be generated. Report specifications 136 descriptively specify the content of reports 128, using variable names corresponding to metrics of target systems 114. A report specification specifies a set of operations for calculating, computing, or determining one or more metrics. The result of the computation is a report value for the metric. In an example, a report specification includes a particular formula for determining a metric named "CPU percentage." The metric "CPU percentage" is computed by dividing a duration of time in which the CPU is in use by a duration of time that has elapsed.

In an embodiment, a report specification specifies a particular format in which report values 130 are to be presented at a user interface. In an example, a report specification provides that a table with three rows is to be displayed. The first row displays a duration of time in which the CPU is in use by a user. The second row displays a duration of time in which the CPU is in use by a system. The third row displays a total duration of time in which the CPU is in use.

In an embodiment, each of report specifications 136 are associated with one or more probes 112. A report specification is referred to herein as being associated with a particular probe if the report specification provides that a report value is to be determined based at least on data detected by the particular probe. In an embodiment, a report specification associated with a particular probe is stored in the probe description of the particular probe.

In an embodiment, report specifications 136 are defined based on user input. Report specifications 136 are defined as part of an initial configuration of probes 112. A report specification, associated with a particular probe, is defined before the particular probe is used to obtain detected data 126. Alternatively, report specifications 136 are added and/or modified after the initial configuration of probes 112. A report specification, associated with a particular probe, is modified after the particular probe has been used at least once to obtain detected data 126.

In one or more embodiments, searchable tags 138 include metadata that is to be associated with report values 130. The metadata includes a keyword, such as "cpu_percent" or "memory_usage."

In an embodiment, a searchable tag is associated with a particular probe. The association between the searchable tag and the particular probe is specified in the probe description of the particular probe. Based on the association, a report value, generated based on data detected using the particular probe, is to be tagged with the searchable tag.

Additionally or alternatively, a searchable tag is associated with a particular metric, whose report value is determined based on data detected using a particular probe. The association between the searchable tag and the particular metric is specified in the probe description of the particular probe. Based on the association, a report value, for the particular metric, generated based on data detected using the particular probe, is to be tagged with the searchable tag.

In an embodiment, searchable tags 138 are specified in a report specification included in a probe description of a particular probe. Searchable tags 138 are specified using a markup language in the report specification. The markup language indicates both a keyword and a metric that is associated with a particular searchable tag. In an example, the markup language for specifying a searchable tag begins with a "<ocpepSearch>" and ends with "</ocpepSearch>." The markup language specifies that the associated keyword is "total_cpu_average." The markup language specifies that the associated metric is "cpu_pct." The complete specification of the searchable tag is, "<ocpepSearch> total_cpu_average="cpu_pct" </ocpepSearch>."

In one or more embodiments, reports 128, including report values 130, are generated based on report specifications 136. A report that includes a set of report values 130 determined using a set of one or more probes is referred to herein as being "associated with the set of one or more probes." Report values 130 of a particular report may correspond to one or more target systems 114.

In an embodiment, report values 130 correspond to metrics that are being monitored or measured from target systems 114. In an example, a metric is "CPU percentage."

A first report value that is measured for "CPU percentage" is 70%. A second report value that is measured for "CPU percentage" is 80%.

In an embodiment, report values 130 include detected data 126 and computed data 127. In an embodiment, detected data 126 refers to data that is detected from target systems 114 using probes 112. Detected data 126 includes raw data that is detected from target systems 114 and has not yet been further processed and/or analyzed. Examples of detected data 126 include but are not limited to (a) a start time and stop time of a particular transaction, (b) a frequency at which a particular memory location is accessed, (c) a number of times that a particular function is called, (d) a "CPU time," which is a duration in which a CPU is in use, and (e) an amount of memory space that is used and/or available.

In an embodiment, computed data 127 is determined by processing detected data 126, using operations and/or computations specified by report specifications 136. An example report value corresponds to the metric "CPU percentage," which is the time in which the CPU is in use divided by the time that has elapsed. Another example report value corresponds to the metric "total CPU," which is the sum of individual CPU times of multiple CPUs operating in a multi-processor system. Another example report value corresponds to the metric "average CPU time," which is the average of CPU times over a given time period. Another example report value corresponds to a correlation coefficient describing the relationship between a response time of a system and a load applied to the system.

In an embodiment, report values 130 are stored in reports 128 for subsequent retrieval. Report values 130 of a particular report are retrieved using an identifier associated with the particular report. Additionally or alternatively, report values 130 that are determined using a particular probe from a particular target system are stored with (a) an identifier of the particular probe and/or (b) an identifier of the particular target system. Thus, report values 130 that correspond to the particular probe may be retrieved using the identifier of the particular probe. Report values 130 that correspond to the particular target system may be retrieved using the identifier of the particular target system.

In an embodiment, report values 130 are presented in a particular format at a user interface, based on report specifications 136. Formats for presenting report values 130 include but are not limited to text, numbers, tables, and graphs. Report values 130 that are tagged with searchable tags 138 are presented with an identifier and/or keyword associated with the searchable tags 138. In an example, a report value 70% (corresponding to a metric named "CPU_PCT") is tagged with a searchable tag that is associated with the keyword "cpu_percent." The report value is presented at the user interface with the searchable tag, as "cpu_percent: 70%."

In one or more embodiments, report value index 140 is an index of report values 130 that are tagged with searchable tags 138. Any type of index may be used, such as a clustered index, a non-clustered index, a column store, and a hash table. Particular report values 130 may be found by applying searchable tags 138 to report value index 140. Trends of particular report values 130 may also be found by applying searchable tags 138 to report value index 140.

In one or more embodiments, performance engine 102 refers to hardware and/or software configured to select and use probes 112 to obtain detected data 126 from target systems 114, to generate reports 128 based on detected data 126, to tag report values 130 with searchable tags 138, and/or to generate report value index 140 using searchable tags 138. Example operations for detecting data from one or more target systems using a probe is described below with reference to FIG. 2A. Example operations for tagging one or more report values with a searchable tag is described below with reference to FIG. 2B.

In an embodiment, performance engine 102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a mainframe, a television, a content receiver, a set-top box, a printer, a mobile handset, a smartphone, a personal digital assistant ("PDA").

3. Detecting Data from Target Systems Using a Probe

Figure 2A:
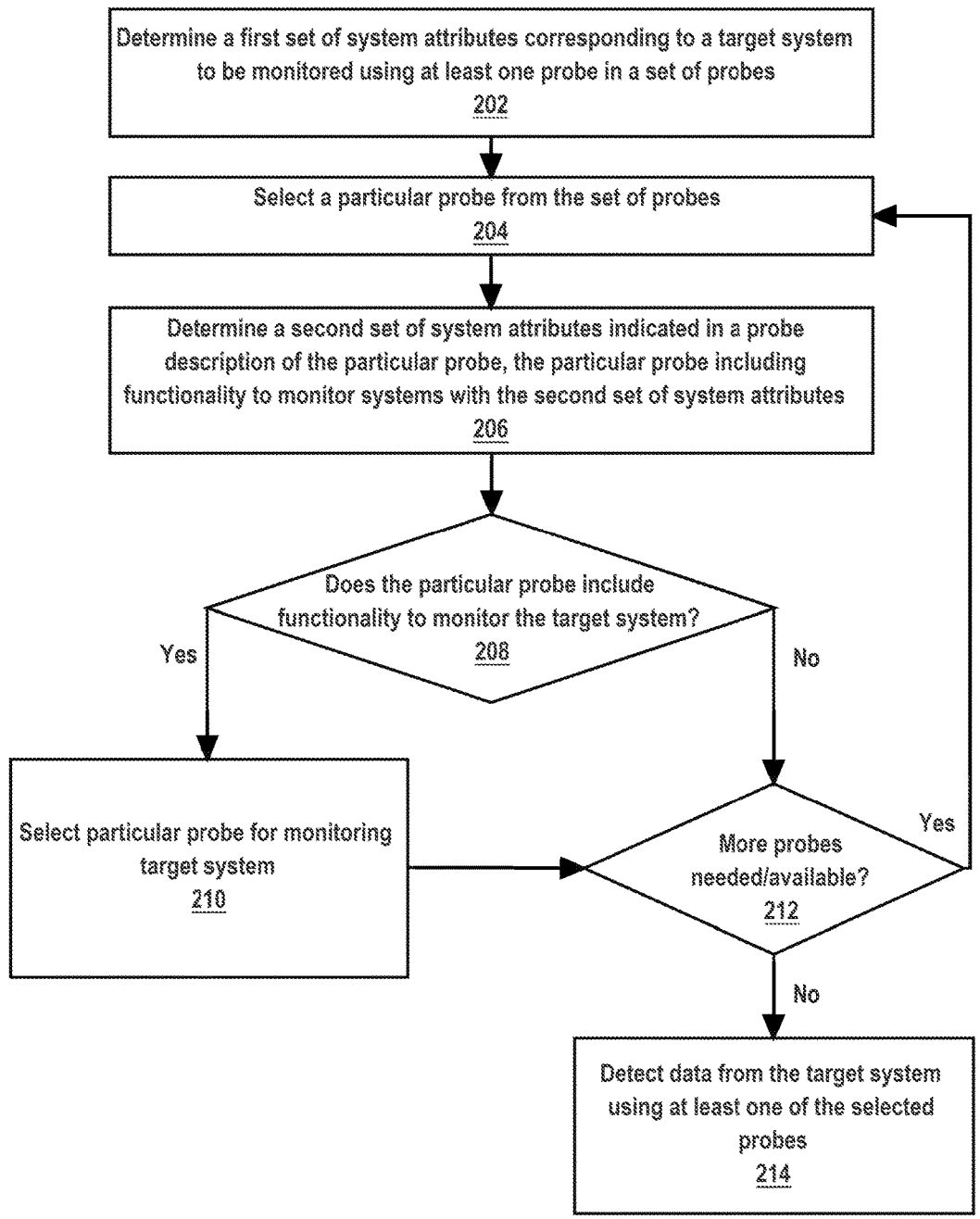
FIG. 2A illustrates an example set of operations for detecting data from one or more target systems using a probe, in accordance with one or more embodiments.

FIG. 2A illustrates an example set of operations for detecting data from one or more target systems using a probe, in accordance with one or more embodiments. One or more operations illustrated in FIG. 2A may be modified, rearranged, or omitted all together. Accordingly, the particular sequence of operations illustrated in FIG. 2A should not be construed as limiting the scope of one or more embodiments.

Initially, a first set of system attributes corresponding to a target system is determined, in accordance with one or more embodiments. The target system is a system that is to be monitored using at least one probe in a set of probes (Operation 202). The first set of system attributes of the target system may be specified manually or detected by a performance engineering platform.

In an example, a performance engineering platform performs a scan of a target system. Based on the scan, the performance engineering platform determines a number and type components used in the target system. Thus, the system attributes are determined through detection by a system.

In an example, a user manually selects a target system and enters the system attributes of the target system. The user reads a specification of the target system, and sees that the target system uses three CPUs, a Linux OS, and a particular application. The user inputs to a performance engineering platform that the target system uses three CPUs, a Linux OS, and a particular application. Further, the user is aware that the target system is known to suffer an issue related to a throughput of a particular database. The user also inputs that the throughput of the particular database is an issue of the target system. Thus, the system attributes are determined based on user input.

In one or more embodiments, a particular probe is selected from the set of probes as a candidate to monitor a target system (Operation 204). The particular probe may be randomly selected from the set of probes, or the particular probe may be selected based on one or more criteria. In an example, the particular probe is selected based on prior usage. The particular probe is selected because the particular probe is the most commonly used probe in the set of probes.

In one or more embodiments, a second set of system attributes indicated in a probe description of the particular probe are determined. The particular probe includes functionality to monitor systems with the second set of system attributes (Operation 206). The second set of system attributes are stored in the probe description of the particular probe. The probe description of the particular probe is identified by finding a probe description including an identifier of the particular probe. Alternatively, the probe description of the particular probe is identified by looking up a table that maps each probe to its associated description. After the probe description is identified, the second set of system attributes are retrieved or obtained from the probe description.

In one or more embodiments, an inquiry is made as to whether the particular probe includes functionality to monitor the target system (Operation 208). In an embodiment, the particular probe includes functionality to monitor the target system if a match exists between the first set of system attributes and the second set of system attributes. Various criteria for determining a match between the first set of system attributes and the second set of system attributes may be used. In an embodiment, a match is found if the first set of system attributes is the same as the second set of system attributes. In another embodiment, a match is found if one or more of the first set of system attributes overlaps with one or more of the second set of system attributes.

In an example, a first set of system attributes of a target system include: three CPUs, a Linux OS, and a human resources application xyz. A second set of system attributes identified in a probe description of a particular probe include: the human resources application xyz and a customer relationship management application abc. A match is found responsive to determining that both the first set of system attributes and the second set of system attributes include the human resources application xyz. Therefore, the particular probe has functionality to detect data of the target system.

In an embodiment, the particular probe includes functionality to monitor the target system if a match exists between (a) issues associated with a target system and (b) issues indicated in the probe description of the particular probe for which the particular probe has functionality to obtain detected data.

In an example, on a previous execution of a target system, a particular database of the target system was accessed at a speed that was below a minimum threshold. The speed at which data was retrieved from the particular database was identified as an issue associated with the target system. A probe description of a particular probe indicates that the particular probe has functionality to detect data associated with the speed at which a database is accessed. A match is found responsive to determining that (a) an issue associated with the target system is the speed at which the particular database is accessed and (b) an issue indicated in the probe description of the particular probe is the speed at which a database is accessed. Therefore, the particular probe has functionality to detect data of the target system.

In one or more embodiments, if the particular probe does not include functionality to monitor the target system, then the particular probe is not selected for monitoring the target system. However, if the particular probe includes functionality to monitor the target system, then the particular probe is selected for monitoring the target system (Operation 210). The particular probe is temporarily flagged as being selected. After each of the set of probes are processed, the particular probe may be used to detect data from the target system, as discussed below. Alternatively or in addition, probes may be selected, by a user via user input, for monitoring the target system.

In one or more embodiments, an inquiry is made as to whether additional probes are needed and/or available (Operation 212). In an embodiment, a desired number of probes for monitoring a target system is specified. An inquiry is made as to whether the desired number of probes have been selected for monitoring the target system. If the desired number of probes have not been selected, then additional probes are needed. Additionally or alternatively, an inquiry is made as to whether there are any probes in the set of probes that have not yet been processed. If there is at least one probe in the set of probes that has not yet been processed, then additional probes are available.

In one or more embodiments, if additional probes are needed and/or available, then Operations 204-212 are repeated. Operations 204-212 are repeated until no additional probes are needed and/or available.

In one or more embodiments, if no additional probes are needed and/or available, then data is detected from the target system, using at least one of the selected probes (Operation 214). In an embodiment, the selected probe performs one or more operations to detect data of the target system. In an example, a probe is configured to detect a response time for retrieving data from a database in a target system. The probe performs the following operations:

(A) Detect the execution of a command that accesses the database;
(B) Determine a time at which the command is executed, which is the start time for the transaction;
(C) Detects the return of data from the database;
(D) Determine a time at which the data is returned, which is the stop time for the transaction; and
(E) Subtract the start time from the stop time, to obtain a response time.

In an embodiment, the detected data is stored in a database or other memory for subsequent retrieval. In an embodiment, at least one of probes selected at Operation 210 is used multiple times to detect data from a same target system. Each time the selected probe is used, a set of detected data is obtained, and the set of detected data is stored in a database or other memory.

In an embodiment, another target system is selected, and Operations 202-214 are repeated for the other target system. By repeating Operations 202-214 for multiple target systems, a same probe may be selected for monitoring different target systems. A same probe is selected for monitoring different target systems if the system attributes of the different target systems match the system attributes identified in the probe description of the same probe.

4. Tagging Report Values with a Searchable Tag

Figure 2B:
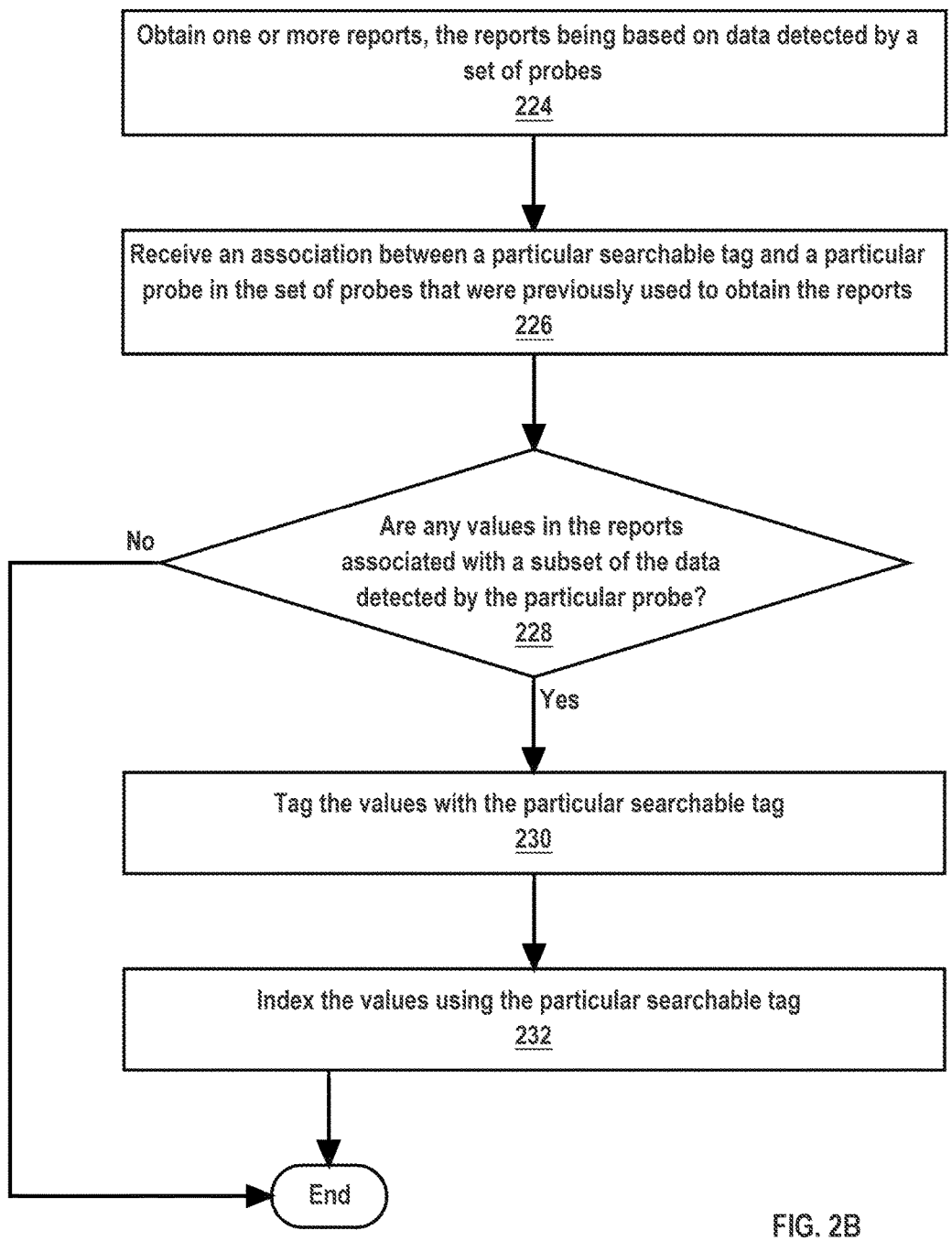
FIG. 2B illustrates an example set of operations for tagging one or more report values with a searchable tag, in accordance with one or more embodiments.

FIG. 2B illustrates an example set of operations for tagging one or more report values with a searchable tag, in accordance with one or more embodiments. One or more operations illustrated in FIG. 2B may be modified, rearranged, or omitted all together. Accordingly, the particular sequence of operations illustrated in FIG. 2B should not be construed as limiting the scope of one or more embodiments. In an embodiment, the operations of FIG. 2B are performed after one or more probes have been used to obtain detected data of a target system. The detected data is obtained as described with reference to FIG. 2A above. The detected data is stored in a database or other memory.

Initially, one or more reports are obtained (received or generated). The reports are based on data detected by a set of probes (Operation 224). In an embodiment, the reports are generated, based on one or more report specifications, using the data detected by the set of probes. The report specifications are received from a user via a user interface or received from another application. The data detected by the set of probes is retrieved from a database or other memory. Then, the data detected by the set of probes is input to the formulas and/or operations specified in the report specifications to generate one or more report values, such as "total CPU time" and "memory usage." The report values, including detected data and computed data, are presented at a user interface according to a format specified by the report specifications.

In an embodiment, the reports are retrieved and/or received from a database or other memory, another application, or another component. The reports may be received over wired or wireless communications.

In an embodiment, multiple reports are based on data detected using a single probe. Each report corresponds to a different testing session in which the probe was used. Additionally or alternatively, a single report is based on data detected using multiple probes.

In one or more embodiments, an association between a particular searchable tag and a particular probe is received (Operation 226). The particular probe is one of the set of probes that were previously used to obtain the reports at Operation 224. In an embodiment, the association between the searchable tag and the particular probe is received via user input or received from another application. The association between the searchable tag and the particular probe is established within the report specification of the respective probe description. In an example, the association is indicated in a report specification and/or a probe description associated with the particular probe using a markup language. The markup language uses certain key terms, such as "<ocpepSearch>" and "</ocpepSearch>," to delineate a beginning and an end of a definition of the searchable tag. The line "<ocpepSearch> cpu_total_average </ocpepSearch>" included in the report specification of the particular probe, for example, indicates that there is an association between the searchable tag, "cpu_total_average," and the particular probe.

In an embodiment, the association between the particular searchable tag and the particular probe includes a specific association between the particular searchable tag and a metric whose value is computed and/or determined based on data detected using the particular probe. In an example, the metric "cpu_pct" is the total CPU usage of a target system. The metric "cpu_pct" is computed and/or determined using data detected by a particular probe. The line "<ocpepSearch> cpu_total_average="cpu_pct" </ocpepSearch>" included in a report specification of the particular probe indicates that there is an association between the searchable tag, "cpu_total_average," and the metric "cpu_pct."

In an embodiment, the association between the particular searchable tag and the particular probe is received after the particular probe has been used to detect data from a target system (using, for example, the operations described with reference to FIG. 2A). The association is received as a modification or update of a report specification and/or a probe description associated with the particular probe. Alternatively, the association is received as part of a new report specification and/or a new probe description associated with the particular probe.

In one or more embodiments, an inquiry is made as to whether any values in the reports are associated with at least a subset of the data detected by the particular probe (Operation 228). A value is associated with a subset of the data detected by the particular probe if the value is generated based on the subset of the data detected by the particular probe. In an example, a first probe detects a response time of a database, and a second probe detects a usage of a CPU by input/output (I/O) devices. Reports are generated based on the data detected by the first probe and the second probe. A value in one of the reports is the total usage of the CPU.

The total usage of the CPU is based on the usage of the CPU by I/O devices. Thus, the total usage of the CPU is associated with the data detected by the second probe, but not associated with the data detected by the first probe.

In one or more embodiments, if there are no values in the reports that are associated with at least a subset of the data detected by the particular probe, then the process ends. If there are values in the reports that are associated with at least a subset of the data detected by the particular probe, then the values are tagged with the particular searchable tag (Operation 230). In an embodiment, tagging the values includes storing the values with a hash symbol ("#"), or other symbol, that is indicative of a tag. In another embodiment, tagging the selected report values includes storing a link or pointer between the values and the searchable tag.

In an embodiment, tagging the values includes presenting the values with the particular searchable tag at a user interface. In an example, the value "1 ms" for the response time of a particular component is to be tagged with the searchable tag "response_time." The user interface presents the value "1 ms" with the searchable tag, as follows, "response_time: 1 ms."

In one or more embodiments, the values are indexed using the particular searchable tag (Operation 232). Values that are tagged with the particular searchable tag are stored in a particular format that facilitates subsequent sorting and/or searching. The values are indexed by the particular searchable tag. Various types of indexes may be used, such as a hash table, a binary tree, and an array index.

In an embodiment, a trend associated with the target system is identified using the index. Values tagged with the particular searchable tag are retrieved based on the index. The values are then analyzed to determine the trend. A trend may indicate that values for a certain metric are increasing or decreasing over time. Alternatively, a trend may indicate that values for a certain metric are correlated with the values for another metric. In an example, the usage of a CPU is correlated with a load placed on the target system. The higher the load, the higher the CPU usage.

5. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3A:
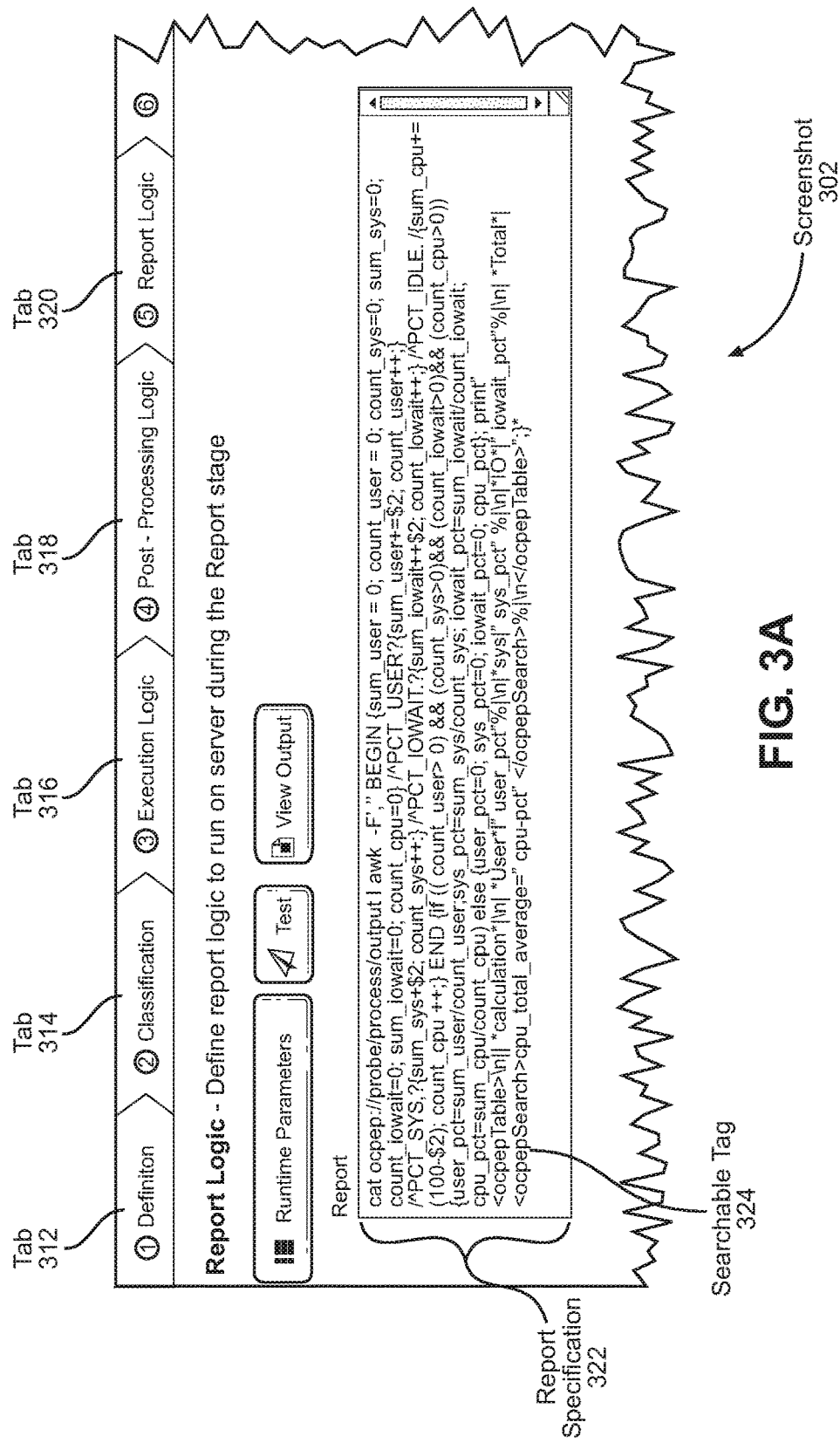

FIGS. 3A-3C illustrate an example performance engineering platform using probes and searchable tags. Referring to FIG. 3A, screenshot 302 shows a description of a probe. The description includes tabs 312-320. Tab 312 is named "Definition." Tab 312 corresponds to the definition of the probe. Tab 312 includes fields for specifying a name and an identifier of a probe.

Tab 314 is named "Classification." Tab 314 corresponds to the system attributes of a system that is to be monitored using the probe. One system attribute indicated in tab 314 is, for example, "Linux." The probe has functionality to monitor a system with the system attributes included in Tab 314, such as a system that runs on a Linux operating system.

Tab 316 is named "Execution Logic." Tab 316 corresponds to the operations that are performed by the probe to detect data from a target system. For example, a first operation is to detect a duration of time in which the CPU runs code of user applications. A second operation is to detect a duration of time in which the CPU runs code of an operation system. A third operation is to detect a duration of time in which the CPU runs code corresponding to an I/O device.

Tab 318 is named "Post-Processing Logic." Tab 318 corresponds to analyses and/or manipulation of the detected data, to determine one or more report values, or other metrics. The analyses are performed on the data that is detected from executing the operations specified at Tab 316. For example, a percentage of the CPU that is being used by user application is determined based on the duration of time in which the CPU is running code of user applications.

Tab 320 is named "Report Logic." Tab 320 corresponds to report specification 322. Report specification 322 specifies further analyses and/or manipulation that is to be performed on the detected data, in order to determine report values for one or more metrics. For example, a percentage of the CPU that is being used by non-OS operations is determined by adding the percentage of the CPU that is used by user applications and the percentage of the CPU that is used by I/O devices. Report specification 322 also specifies a particular display format in which the report values are to be presented at a user interface.

After tabs 312-320 of the probe description shown at screenshot 302 are specified via user input, the probe, corresponding to the description, is used to detect data from a target system. The target system is scanned to determine system attributes of the target system. One system attribute of the target system is that the target system runs on a Linux operating system.

The system attributes of the target system are compared to the system attributes indicated at tab 314, "Classification." A match is determined, since (a) a system attribute of the target system is that a Linux OS is used, and (b) a system attribute indicated at tab 314 is that a Linux OS is used.

The probe performs the operations indicated at tab 316 to detect data of the target system. The probe detects that a duration of time in which the CPU runs code of user applications, a duration of time in which the CPU runs code of an operation system, and a duration of time in which the CPU runs code corresponding to an I/O device.

Based on the logic indicated in tabs 318-320, report values are determined. Specifically, the following values are determined:

Percentage of the CPU that is used by user applications: 0%

Percentage of the CPU that is used by the OS: 0.13%

Percentage of the CPU that is used by I/O devices: 0%

Percentage of the CPU used be non-OS operations: 0%

Subsequently, report specification 322 is modified. In particular, computation of a new metric, called "cpu_pct," is added. The new metric corresponds to the total percentage use of the CPU. The total percentage use of the CPU is determined by adding the percentage of the CPU that is used by user applications, the percentage of the CPU that is used by the OS, and the percentage of the CPU that is used by I/O devices.

In addition, searchable tag 324 is added to report specification 322 using a markup language. Searchable tag 324 is specified as follows, "<ocpepSearch> cpu_total_average='cpu_pct' </ocpepSearch>." The terms, "<ocpepSearch>" and "</ocpepSearch>," indicate a beginning and an end of a definition of searchable tag 324. The keyword for searchable tag 324 is "cpu_total_average." The report value to be tagged is the value stored as "cpu_pct."

After searchable tag 324 is added to report specification 322, the detected data that was previously obtained using the probe, is retrieved from the database. The duration of time in which the CPU runs code of user applications, the duration of time in which the CPU runs code of an operation system, and the duration of time in which the CPU runs code corresponding to an I/O device are retrieved.

Based on the modified report specification 322, and using the retrieved detected data, a report value for "cpu_pct" is determined. Specifically, the following values are determined:

Percentage of the CPU that is used by user applications: 0%

Percentage of the CPU that is used by the OS: 0.13%

Percentage of the CPU that is used by I/O devices: 0%

Total Percentage of the CPU used (named "cpu_pct"): 0.13%

Based on searchable tag 324, the value "0.13%" (for the metric "cpu_pct) is tagged with the keyword "cpu_total_average." Moreover, the value "0.13%" is indexed, using "cpu_total_average."

Referring to FIG. 3B, a report is shown in screenshot 304. The report is generated based on the probe description shown in screenshot 302. The report shows report values 326-328. Report values 328 include:

Percentage of the CPU that is used by user applications: 0%

Percentage of the CPU that is used by the OS: 0.13%

Percentage of the CPU that is used by I/O devices: 0%

Total Percentage of the CPU used: 0.13%

The report shown in screenshot 304 includes a section for presenting report values that are tagged with searchable tags. A table includes two columns, "Index" and "Value." The "Index" column includes the names of the searchable tags. The "Value" column includes the report values tagged with the searchable tags.

As described above, report value 326, corresponding to "cpu_pct," is tagged with searchable tag 324, corresponding to "cpu_total_average." Thus, "cpu_total_average" is presented in the "Index" column, while "0.13%" is presented in the "Value" column.

Referring to FIG. 3C, a user interface for performing a report search is shown in screenshot 306. Search fields 330 include a dropdown menu, including a list of searchable key terms. One or more key terms may be selected. Search fields 330 include fields for specifying a criterion for each key term. A criterion may be "greater than," "less than," or "equal to," a certain number. Based on the criteria for the key terms, a list of search results would be presented. The search results would include each testing session that matches the criteria.

As described above, report specification 322 has been amended to include searchable tag 324. Based on the amendment, the list of keywords that may be searched is extended to include searchable tag 324. As illustrated, the dropdown menu adds searchable tag 324, "cpu_total_average." The report values for "cpu_total_average," stored in previously-generated reports, are searchable.

A user selects "cpu_total_average" from the dropdown menu. The user specifies that a criterion is that "cpu_total_average" is equal to "0.13%." Based on the search query, the search results include the testing session corresponding to the report shown at screenshot 304. The report shown at screenshot 304 shows that "cpu_total_average" is equal to "0.13%."

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
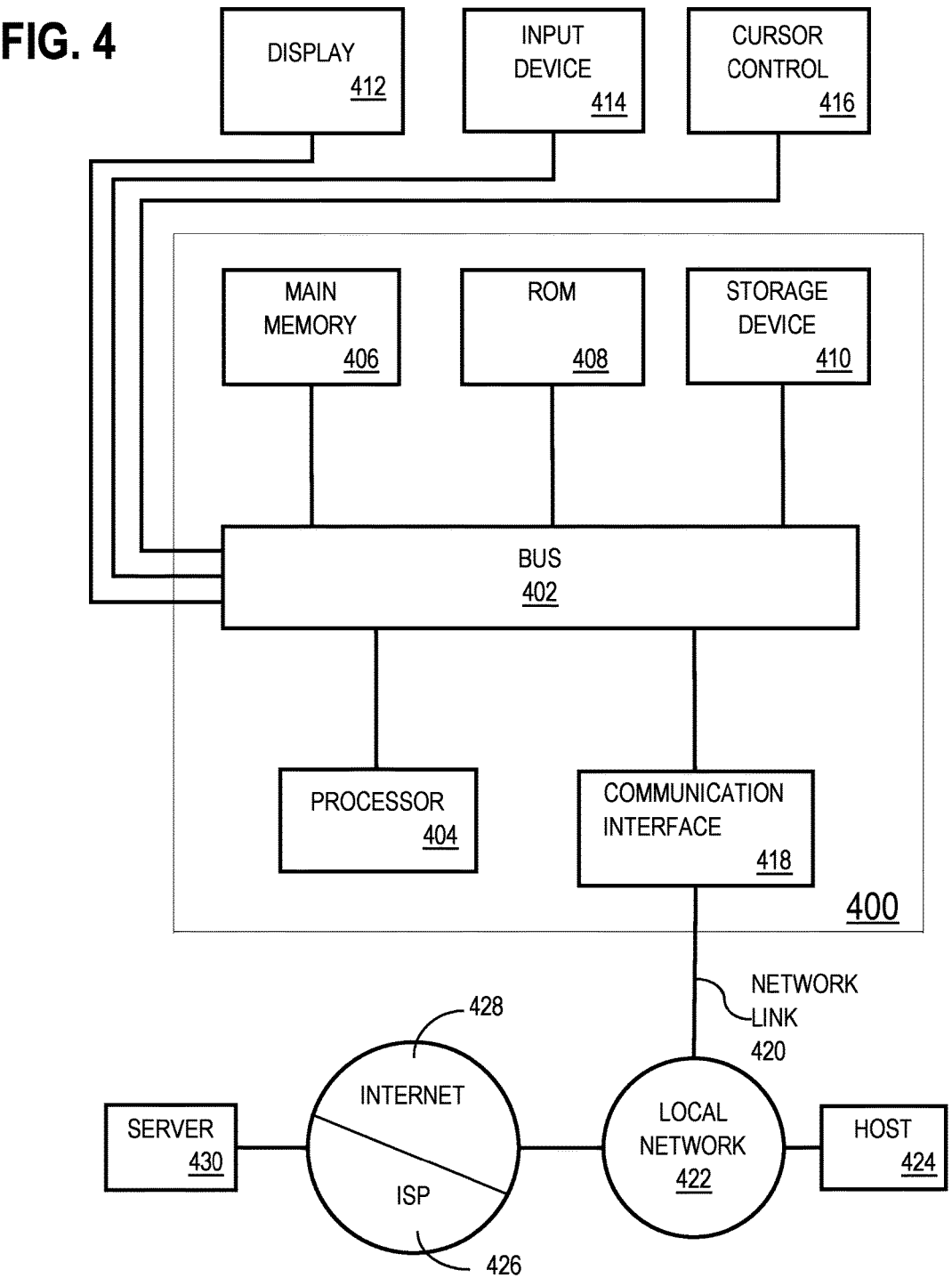
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   detecting a plurality of sets of data from a target system using a plurality of probes, wherein both a first set of data and a second set of data are detected using a particular probe of the plurality of probes;
   determining a plurality of values based on the plurality of sets of data detected from the target system using the plurality of probes, wherein a particular value is determined based on both the first set of data and the second set of data detected using the particular probe;
   obtaining one or more reports including the plurality of values but not including a particular searchable tag;

subsequent to obtaining the one or more reports:
receiving a request to associate the particular searchable tag with the particular probe;
responsive to receiving the request to associate the particular searchable tag with the particular probe:
identifying the particular value, of the plurality of values, that was determined based on both the first set of data and the second set of data detected using the particular probe; and
tagging the particular value with the particular searchable tag associated with the particular probe.

2. The medium of claim 1, wherein the plurality of values are determined based on one or more report specifications, and the request to associate the particular searchable tag with the particular probe is specified using a markup language that annotates the one or more report specifications.

3. The medium of claim 1, wherein the plurality of values are determined based on one or more report specifications that are received subsequent to the plurality of probes detecting the plurality of sets of data of the target system.

4. The medium of claim 1, wherein the request to associate the particular searchable tag with the particular probe is received from a user through a user interface.

5. The medium of claim 1, wherein the plurality of sets of data is detected using the plurality of probes before the request to associate the particular searchable tag with the particular probe is received.

6. The medium of claim 1, wherein the operations further comprise: generating an index of the plurality of values using the particular searchable tag.

7. The medium of claim 6, wherein the operations further comprise: determining a trend associated with the plurality of values based on the index.

8. A method, comprising:
detecting a plurality of sets of data from a target system using a plurality of probes, wherein both a first set of data and a second set of data are detected using a particular probe of the plurality of probes;
determining a plurality of values based on the plurality of sets of data detected from the target system using the plurality of probes, wherein a particular value is determined based on both the first set of data and the second set of data detected using the particular probe;
obtaining one or more reports including the plurality of values but not including a particular searchable tag;
subsequent to obtaining the one or more reports:
receiving a request to associate the particular searchable tag with the particular probe;
responsive to receiving the request to associate the particular searchable tag with the particular probe:
identifying the particular value, of the plurality of values, that was determined based on both the first set of data and the second set of data detected using the particular probe; and
tagging the particular value with the particular searchable tag associated with the particular probe;
wherein the method is performed by at least one device including a processor.

9. The method of claim 8, wherein the plurality of values are determined based on one or more report specifications, and the request to associate the particular searchable tag with the particular probe is specified using a markup language that annotates the one or more report specifications.

10. The method of claim 8, wherein the plurality of values are determined based on one or more report specifications that are received subsequent to the plurality of probes detecting the plurality of sets of data of the target system.

11. The method of claim 8, wherein the request to associate the particular searchable tag with the particular probe is received from a user through a user interface.

12. The method of claim 8, wherein the plurality of sets of data is detected using the plurality of probes before the request to associate the particular searchable tag with the particular probe is received.

13. The method of claim 8, further comprising: generating an index of the plurality of values using the particular searchable tag.

14. The method of claim 13, further comprising: determining a trend associated with the plurality of values based on the index.

15. A system, comprising:
at least one device including a hardware processor; and
the system being configured to perform operations comprising:
detecting a plurality of sets of data from a target system using a plurality of probes, wherein both a first set of data and a second set of data are detected using a particular probe of the plurality of probes;
determining a plurality of values based on the plurality of sets of data detected from the target system using the plurality of probes, wherein a particular value is determined based on both the first set of data and the second set of data detected using the particular probe;
obtaining one or more reports including the plurality of values but not including a particular searchable tag;
subsequent to obtaining the one or more reports:
receiving a request to associate the particular searchable tag with the particular probe;
responsive to receiving the request to associate the particular searchable tag with the particular probe:
identifying the particular value, of the plurality of values, that was determined based on both the first set of data and the second set of data detected using the particular probe; and
tagging the particular value with the particular searchable tag associated with the particular probe.

* * * * *

UNITED STATES PATENT AND TRADEMARK OFFICE
CERTIFICATE OF CORRECTION

PATENT NO.       : 10,127,128 B2
APPLICATION NO.  : 14/956028
DATED            : November 13, 2018
INVENTOR(S)      : Che et al.

Page 1 of 1

It is certified that error appears in the above-identified patent and that said Letters Patent is hereby corrected as shown below:

In the Drawings

Drawing sheet 4 of 7, in FIG. 3A, under Reference Numeral 312, Line 1, delete "Definiton" and insert -- Definition --, therefor.

Signed and Sealed this
Fifth Day of November, 2019

Andrei Iancu
*Director of the United States Patent and Trademark Office*